(12) United States Patent
Djabarov et al.

(10) Patent No.: US 9,241,240 B2
(45) Date of Patent: Jan. 19, 2016

(54) TECHNIQUES FOR SERVER-CONTROLLED TILING OF LOCATION-BASED INFORMATION

(71) Applicant: Facebook, Inc., Menlo Park, CA (US)

(72) Inventors: Gueorgui Djabarov, Sunnyvale, CA (US); Daniel Jeng-Ping Hui, Palo Alto, CA (US); Joshua Williams, Menlo Park, CA (US)

(73) Assignee: FACEBOOK, INC, Menlo Park, CA (US)

( * ) Notice: Subject to any disclaimer, the term of this patent is extended or adjusted under 35 U.S.C. 154(b) by 322 days.

(21) Appl. No.: 14/018,908

(22) Filed: Sep. 5, 2013

(65) Prior Publication Data
US 2015/0067032 A1      Mar. 5, 2015

(51) Int. Cl.
*H04W 4/02* (2009.01)

(52) U.S. Cl.
CPC .................... *H04W 4/021* (2013.01)

(58) Field of Classification Search
CPC ......... H04W 4/02; H04W 4/021; H04W 4/18; H04M 1/72522; H04M 3/42348
USPC .......... 455/414.1, 414.2, 414.3, 456.1–456.3, 455/457
See application file for complete search history.

(56) References Cited

U.S. PATENT DOCUMENTS

| | | | |
|---|---|---|---|
| 6,577,714 B1 | 6/2003 | Darcie et al. | |
| 8,954,860 B1 * | 2/2015 | Hands | G06F 17/30873 715/738 |
| 2006/0170693 A1 | 8/2006 | Bethune et al. | |
| 2008/0109159 A1 | 5/2008 | Shi et al. | |
| 2008/0172632 A1 | 7/2008 | Stambaugh | |
| 2008/0238941 A1 | 10/2008 | Kinnan et al. | |
| 2009/0160873 A1 | 6/2009 | Kew et al. | |
| 2009/0303251 A1 | 12/2009 | Balogh et al. | |
| 2010/0138294 A1 * | 6/2010 | Bussmann | G06Q 30/00 705/14.49 |
| 2010/0321399 A1 | 12/2010 | Ellren et al. | |
| 2011/0055290 A1 | 3/2011 | Li et al. | |

(Continued)

OTHER PUBLICATIONS

International Search Report and Written Opinion received for PCT Patent Application No. PCT/US2014/045859, mailed Oct. 20, 2014, 19 pages.

(Continued)

*Primary Examiner* — Magdi Elhag

(74) *Attorney, Agent, or Firm* — Kacvinsky Daisak Bluni PLLC

(57) ABSTRACT

Techniques for server-controlled tiling of location-based information are described. An apparatus may comprise a communication component and a tile component. The communication component may be operative to receive a location-based search request from a client application, the location-based search request comprising a geographic area, and to transmit a plurality of tiles to the client application. The tile component may be operative to determine the plurality of tiles as a set of tiles that cover the geographic area, each tile of the plurality of tiles covering a portion of the geographic area and comprising a set of locations. Other embodiments are described and claimed.

19 Claims, 11 Drawing Sheets

(56) References Cited

U.S. PATENT DOCUMENTS

| | | | |
|---|---|---|---|
| 2011/0131376 A1* | 6/2011 | Fischer | G06F 17/30241 711/119 |
| 2012/0057646 A1* | 3/2012 | Jovicic | G01S 5/0289 375/295 |
| 2012/0221363 A1 | 8/2012 | Slowe et al. | |
| 2013/0073374 A1* | 3/2013 | Heath | G06Q 30/02 705/14.39 |
| 2013/0095892 A1 | 4/2013 | Bliss et al. | |
| 2013/0124563 A1* | 5/2013 | CaveLie | G06F 17/30241 707/770 |
| 2013/0151645 A1* | 6/2013 | Siliski | G06F 17/30902 709/213 |
| 2014/0141803 A1* | 5/2014 | Marti | H04W 4/043 455/456.2 |
| 2015/0074596 A1* | 3/2015 | Djabarov | G06F 3/0485 715/800 |

OTHER PUBLICATIONS

Extended European Search Report received for European Patent Application No. 14183375.6, mailed Jan. 29, 2015, 9 pages.

Liu et al., "Implementing a Caching and Tiling Map Server: a 2.0 Web Case Study", Collaborative Technologies and Systems, 2007, 10 pages.

* cited by examiner

900

> Receive a location-based request from a client application, the location-based request comprising a geographic area.
> 902

> Determine a plurality of tiles that cover the geographic area, each tile of the plurality of tiles covering a portion of the geographic area and comprising a set of locations.
> 904

> Transmit the plurality of tiles to the client application.
> 906

TECHNIQUES FOR SERVER-CONTROLLED TILING OF LOCATION-BASED INFORMATION

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for server-controlled tiling of location-based information. Some embodiments are particularly directed to techniques for server-controlled tiling of location-based information delivered in response to a location-based search request. In one embodiment, for example, an apparatus may comprise a communication component and a tile component. The communication component may be operative to receive a location-based search request from a client application, the location-based search request comprising a geographic area, and to transmit a plurality of tiles to the client application. The tile component may be operative to determine the plurality of tiles as a set of tiles that cover the geographic area, each tile of the plurality of tiles covering a portion of the geographic area and comprising a set of locations. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 9 illustrates an embodiment of a logic flow for the system of FIG. 1.

DETAILED DESCRIPTION

Figure 1:
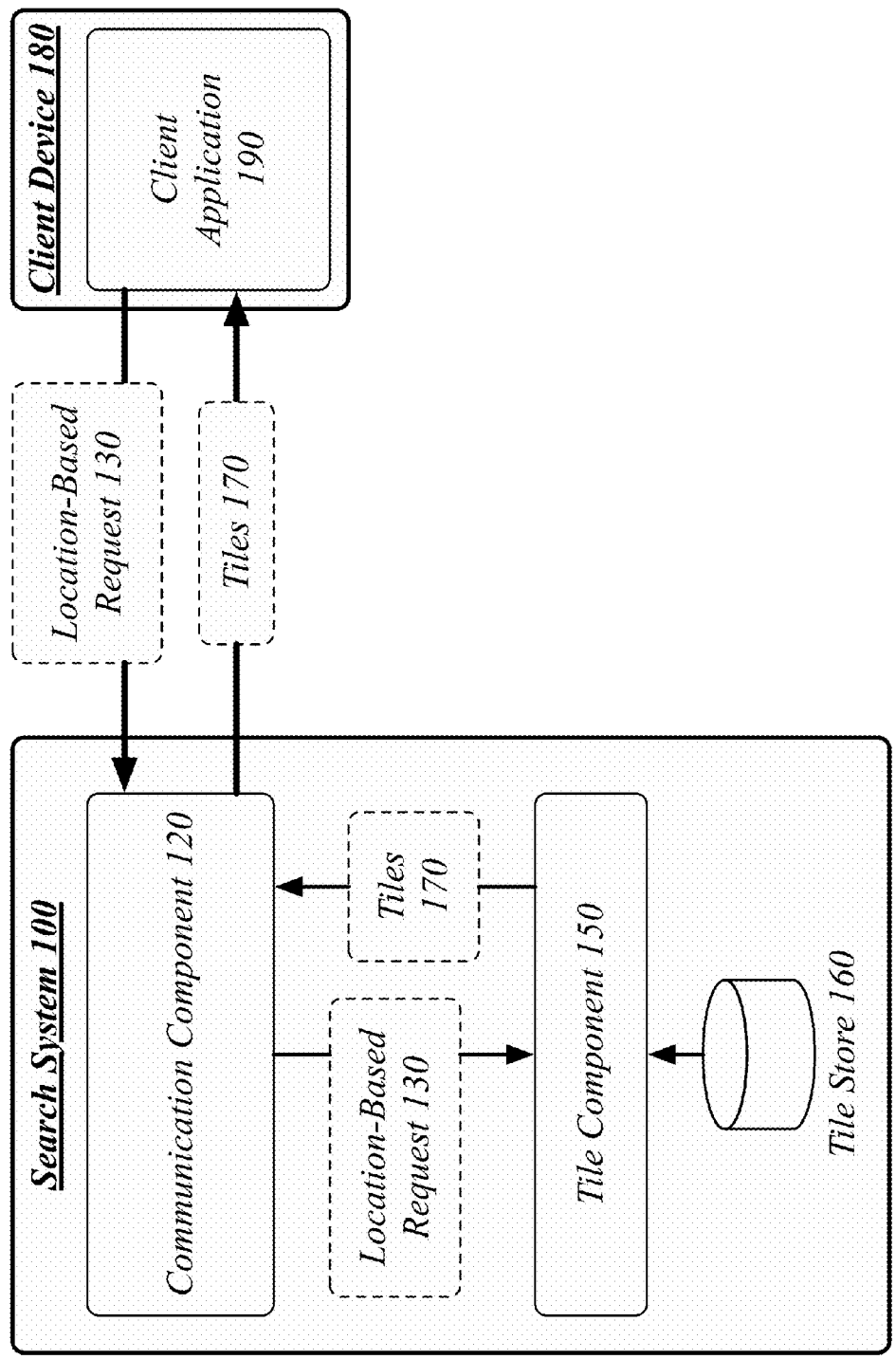
FIG. 1 illustrates an embodiment of a system for server-controlled tiling of location-based information.

Various embodiments are directed to techniques for server-controlled tiling of location-based information. Computing devices may exchange location-based information, information that is tied or specific to a particular geographic location. One computing device may make a request to another to receive a list of locations within a particular geographic area. This may be a general request to receive a list of all locations known to the sender within the geographic area or may be limited to a certain topic, to those relevant to a search, to a specified category, or otherwise restricted. This request may be made by a web server to a backend server in order to create a map display, it may be made by a web browser to a web server to receive a web page containing geographic information, it may be made by a client device to a server to receive the location-based information for display on the client device, or between any pair of computing devices.

A request for location-based information may be specified through a defined geographic area. A request may be specific to a rectangular geographic area, which may correspond to a geographic area being displayed or being prepared for a display by a computing device. For example, a mobile device may receive a request from a user to display local restaurants and prepare to display the local area around the device with an overlay of restaurants within that local area, such as a portion of a user interface of the mobile device. The size, scope, and boundaries of this area may be determined by the mobile device in accordance with various techniques to estimate an initial display area for location-based information. The mobile device may then include the rectangle—such as may be defined by two latitude and longitude pairs—with a request to a server to receive a list of restaurants contained within that area along with the specific location of those restaurants. It will be appreciated that this determination of a map area may be similarly performed by a procedure running within a web browser, web server, or any other device preparing a map for display with an overlay of locations.

In some embodiments of a search system, a full two-dimensional ranged search may be performed to determine the locations within the specified geographic area. However, it may be advantageous to predetermine or cache search results, either or both on the client device receiving the location-based information and the server device transmitting the location-based information. The location-based information may therefore be organized according to tiles, where a tile embodies a pre-calculated set of location-based information for a defined geographic area, such as a rectangle. For instance, San Francisco may be broken up into distinct geographic areas and locations within each geographic area collected together into a tile. A request for location-based information for a portion of San Francisco may therefore be responded to by producing a set of tiles whose combined areas cover the specified portion of the city. As the boundaries of the tiles are unlikely to precisely match the boundaries of a search area, additional locations outside the search area may be included in the response, but the bandwidth used to transmit these extraneous locations and the processing used to them may be more than made up for by the advantages of pre-calculating the tiles: tiles may be pre-calculated during off-peak hours to reduce load during peak hours and response time may be improved by reducing the amount of work done on-demand.

In some embodiments, the tiling schema used may be predetermined, universal across all areas, and known in advance by the client device receiving the tiles. For instance, a flattened map of the entire world may be broken into squares of equal size and each assigned an identifying code such that a client device desiring location-based information need merely request the tiles that, according to the tiling scheme, will cover the geographic area of interest. However, there are advantages to another approach. If the client device is agnostic as to the tiling scheme then the tiling scheme can be varied in different locations, for different categories of results, according to changes in mapped areas, according to changes in infrastructure, software design, or provider priority, and as empirical experience with providing location-based information reveals problems, limitations, or disadvantages with a current tiling schema.

For example, the bandwidth cost of transmitting a tile scales with the number of locations contained therein, which encourages breaking tiles with a large number of locations into smaller tiles so as to limit the number of superfluous locations transmitted with border tiles that straddle the boundary of a geographic search area. However, a tile may contain header information, metadata, and other per-tile data that adds to the bandwidth used to transmit the tile, such that transmitting a large number of low-population tiles may waste bandwidth that would not be used with larger tiles. Further, the computation time used to determine the set of tiles may scale according to the number of tiles. As the number of locations relevant to a request within a tile may vary according to location (a city may be denser than a rural area), category (Hollywood, Calif. has more results for "movie studio" than Houston, Tex.), time (as a city gains or loses population), and such, varying the size of tiles may be valuable. If client applications are agnostic to the tiling schema, such changes may be made on the server end, so that the client applications need not have their understanding of a tiling schema be updated in advance of using a new tiling schema.

In some embodiments, different tiling schemas and different tiles may be used at different zoom levels or scopes of search. Not all results may be equally useful at all scopes of search. For instance, a user searching for a pizza place within five blocks of their home may receive a benefit by seeing every pizza place within that range and being allowed to select from among them. However, a user planning a trip to New York City and searching across all pizza places therein may be benefited by only seeing the best pizza places in the city. A user planning a trip across Italy may, at this even greater scope, benefit from seeing only the best pizza places in that country. In some embodiments, therefore, there may be a plurality of sets of tiles used, where each set of tiles is specific to a particular range of scopes or zoom levels. Responding to a request for location-based information may therefore include determining or receiving the scope of the search, determining which set of tiles to use, and then determining the collection of tiles within that set which cover the requested geographic area.

As such, users may be benefited by a system for providing location-based information which uses a dynamic tiling schema to which client devices are agnostic. By allowing the server to communicate locations according to tiles of variable size and dimensions, device bandwidth may be used efficiently, the quality of returned results may be improved, and performance information gathered from a test or live system may be incorporated into the results being provided without modification to client systems. As a result, the embodiments can improve the affordability, scalability, modularity, extendibility, and interoperability for the operators and users of a geographic search system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a search system 100. In one embodiment, the search system 100 may comprise one or more components. Although the search system 100 shown in FIG. 1 has a limited number of elements in a certain topology, it may be appreciated that the search system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

The search system 100 may comprise a communication component 120 and tile component 150. The search system 100 may use a tile store 160 storing predetermined tiles for use in responding to received requests. The search system 100 may interact with a plurality of client applications, such as client application 190 on client device 180, receiving location-based requests and responding with sets of tiles.

The communication component 120 may be operative to receive a location-based request 130 from a client application 190, the location-based request 130 comprising a geographic area, and to transmit a plurality of tiles 170 to the client application. The client application 190 may be running on, a component of, or otherwise support by a client device 180. In some embodiments the client device 180 may be a mobile device or other end-user device, but in others may be a server device acting as a client to the search system 100. The client device 180 may be owned by or belong to an external party to the search system 100 or may be commonly owned and managed with the search system 100.

The location-based request 130 may be received according to an established protocol, a custom protocol, a general-use protocol, or according to any other communication technique. The location-based request 130 may be received via the Internet, via a cellular data system, or using any other communications medium. The location-based request 130 may be a search request comprising a geographic area, a search term, a zoom level, and one or more additional pieces of data such as a user identifier, client device identifier, client application identifier, session identifier, or any other piece of metadata potentially relevant to a search. The communication component 120 may forward the location-based request 130 to a tile component 150.

The tile component 150 may be operative to determine the plurality of tiles 170 as a set of tiles that cover the geographic area, each tile of the plurality of tiles 170 covering a portion of the geographic area and comprising a set of locations. The tiles 170 may be retrieved from a tile store 160. Tile store 160 may comprise a database, such as a local database, remote database, or distributed database. The tile component 150 may be operative to perform a geographic lookup on the tile store 160 to determine the plurality of tiles 170. Any of the known techniques for performing a geographic lookup may be performed, such as any of the known techniques for orthogonal range searching.

In some embodiments, the tiles in the tile store 160 may be divided by category, type, search topic, or other classification. Within a specific category, each of the tiles may each exclusively cover a geographic area without overlap or shared area. In some embodiments, the tiles in the tile store 160 may be divided by scope or zoom level. Within a specific scope, each of the tiles may each exclusively cover a geographic area without overlap or shared area. In some embodiments, the tiles in the tile store 160 may be divided by both scope and classification and the tiles within a specific scope and classification may exclusively cover a geographic area without overlap or shared area. Each location stored within the tile store 160 may therefore be stored at most once for a given scope and/or classification. The tile component 150 may be operative to target the geographic lookup in the tile store 160 according to a classification and/or scope and to retrieve exactly the plurality of tiles 170 within that classification and/or scope whose combined respective geographic areas cover the entirety of the geographic area included as part of the location-based search request 130.

A scope or zoom level may be specified according to a variety of techniques in various embodiments. For example, a zoom level may be specified according to a ratio between the viewed extent of an area and its actual extent in the real world. Alternatively, a zoom level may be specified according to an abstract scale using a maximal zoom—the most amount of detail contained within the search system 100—as one extreme with other zoom levels representing iterative reductions in detail. Each of the tiles in the tile store 160 may have associated with it a range of zoom levels for which that tile is to be used. For a given geographic area (and, in some embodiments, classification) each tile may be associated with a particular exclusive range.

The tile store 160, and search system 100, may store or otherwise have knowledge of locations that are relevant to a particular tile's classification and within the geographic area covered by that particular tile and still not stored within the tile. For instance, a tile for a large geographic area (therefore at a large scope and low zoom level) may only contain the most important, relevant, or otherwise worthy results within its geographic area, excluding less important, relevant, or otherwise unworthy results. For example, a tile for use when looking at a scope of an entire state may cover a tenth of the state, including multiple cities, and only include the most important or noteworthy locations within its classification in that area, those multiple cities and their surroundings. A tile for use within the same classification at a lower scope, such as a scope for use when looking at all of one city, may include additional locations not present in the higher-scope tile due to their increased relative importance within the context of a city as compared to a state.

In some embodiments, the scope or zoom level may be included as part of the location-based request 130. In other embodiments the scope or zoom level may be determined implicitly based upon the specified geographic area. For example, a geographic area the size of a state may implicitly suggest a large scope (low zoom level) wherein many locations have been culled, while a geographic area the size of a city block may implicitly suggest a small scope (high zoom level) in which most or all locations are included.

In some embodiments, the location-based request 130 may include a specified search. In some cases, this may be mapped to a category, type, or other classification and all results within that classification in the specified geographic area and determined scope are transmitted to the client application 190 via the plurality of tiles 170 and displayed for the user. However, in other cases, a search may be used to refine which locations are transmitted or displayed within a category of tiles or where tiles are not divided by classification. For instance, each of the locations in the tile store 160 may have associated with it one or more pieces of data describing that location for use in searching the locations. The tile component 150 may be operative to compare a search to the data for the locations in the retrieved plurality of tiles 170 to determine whether each location within the plurality of tiles 170 matches the search. The tile component 150 may be operative to remove locations within the plurality of tiles 170 that are not relevant to a received search prior to transmission to the client application 190.

In some embodiments, the tile component 150 may be operative to flag locations within the plurality of tiles 170 transmitted to the client application 190 as being relevant to a search or irrelevant to a search, such that the client application 190 will only display to the user those locations which are flagged as relevant or which are not flagged is irrelevant. For example, a search for "pizza place" may be classified to a "restaurant" category and initiate the retrieval of restaurant-type tiles from the tile store 160 specific to a geographic area and zoom level. This plurality of tiles 170 may include locations that match the "pizza place" search and locations that do not match the "pizza place" search. All of these locations, both matching and not matching, may be transmitted to the client application 190 along with flags indicating which locations are relevant and which are irrelevant. Alternatively, the client application 190 may determine which locations within the plurality of tiles 170 are relevant to the search rather than the tile component 150.

In either case, the client application 190 may receive the plurality of tiles 170 comprising both relevant locations and irrelevant locations and only display the relevant locations to a user of the device. Transmitting the irrelevant locations to the client application 190, particularly where the client application 190 performs the filtering to determine which locations are relevant to the search, may allow for reuse of the tiles, such as through caching. For example, a user could search for "pizza place," receive a plurality of tiles 170 at a given scope for a given geographic area including all "restaurant" results, and be shown only those locations which the client application 190 determines matches the search "pizza place." A user deciding that no satisfactory pizza place lies within their eating area, or changing their mind on their desired food, might then perform a search for "sushi." Because the received plurality of tiles 170 included all restaurant locations, the client application 190 may re-filter the locations to produce those which match the search for sushi without a round-trip to the search system 100 to receive new tiles.

The client application 190 may be generally operative to cache received tiles and to reuse those tiles where relevant. In some embodiments, tiles may be transmitted with a time-to-live (TTL) value indicating a period after which the tile should be removed from the cache or otherwise not used for search results. In some embodiments, cached tiles with an expired TTL may be used upon reception of a search request from a user and used to display location results while, in parallel, the client application 190 performs a location-based request 130 to receive updated tiles, which are used to replace the display from the expired tiles once received.

Figure 2:
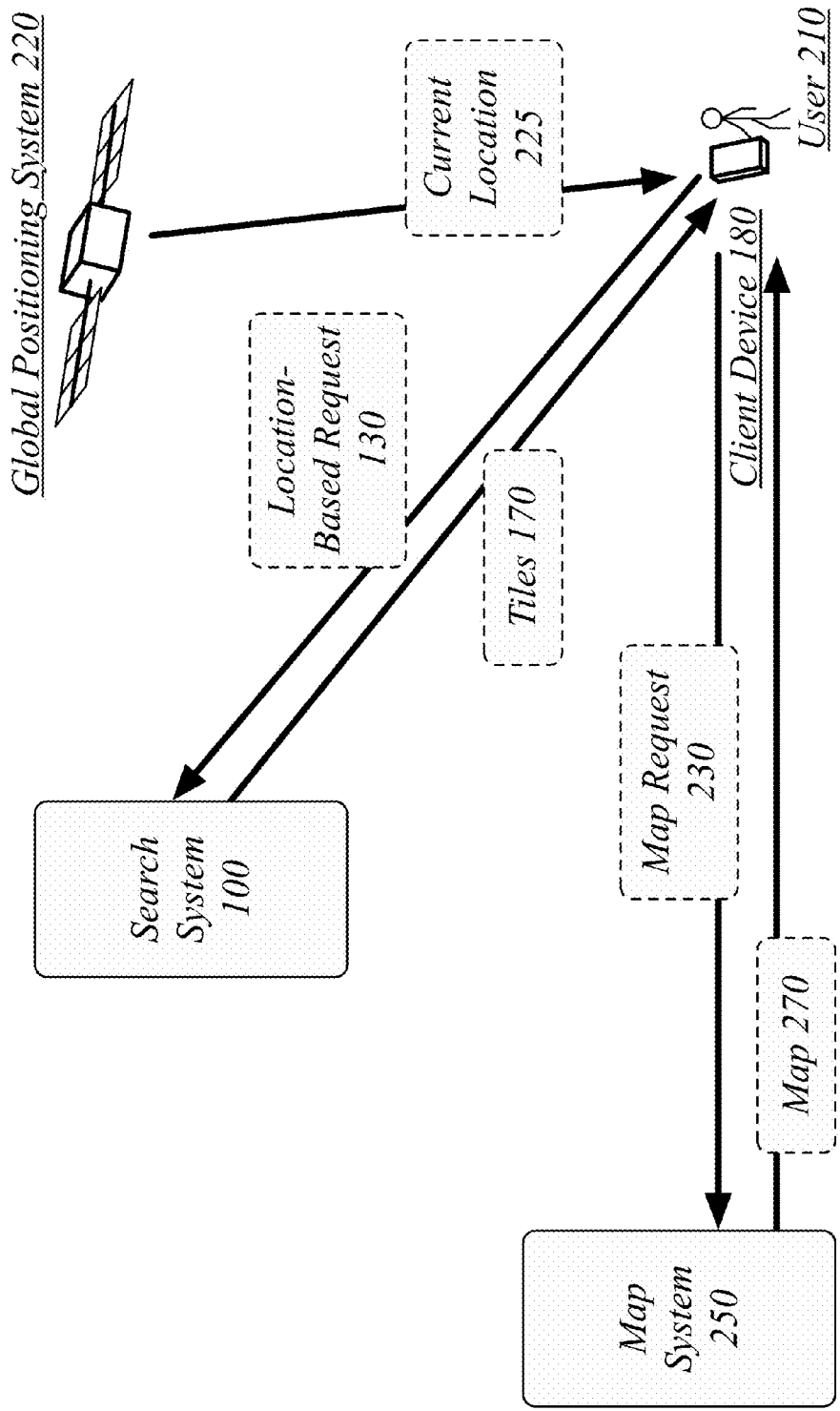
FIG. 2 illustrates an embodiment of an operating environment for the system of FIG. 1.

FIG. 2 illustrates an embodiment of an operational environment 200 for the search system 100. As shown in FIG. 2, a user 210 may use client device 180 to interact with a global positioning system 220, the search system 100, and a map system 250.

In some situations, the client device 180 may be a mobile device being used within the geographic area being searched by a user 210. The client device 180 may be operative to determine its current location 225 via a global positioning system (GPS) 220 using the known techniques for determining location via GPS. The client device 180 may be operative to automatically determine the geographic area used as part of the location-based request 130 based on its current location 225. For example, the geographic area may be centered on the current location 225 or otherwise contain the current location 225 of the client device 180.

The plurality of tiles 170 received from the search system 100 may be displayed on the client device 180 as an overlay on a map 270. The display on the map 270 may include a display of the current location 225 of the client device 180 in relation to the received set of locations.

The map 270 may be retrieved from a map system 250. The client device 180 may transmit a map request 230 to the map system 250 specifying a geographic area, a set of map tiles, or any other technique for making a request to a map system 250. The client device 180 may receive the map 270 as an image, as a set of map tiles, or any other technique for transmitting and receiving a map 270.

The map system 250 may be maintained by a same entity as the search system 100 or by another entity. For instance, where client device 180 is a mobile device, the map system 250 may be associated with a manufacturer of the client device 180 or provider of the operating system for the client device 180. Alternatively, the map system 250 may be selected by the client application 190. In some embodiments, the plurality of tiles 170 may be agnostic as to which map system 250 of a plurality of available map systems is used to receive the map 270. For example, on a first type of client device a first map system may be used and on a second type of client device a second map system may be used, with the search system 100 independent of the chosen map system and the plurality of tiles 170 the same whichever map system is used.

Figure 3:
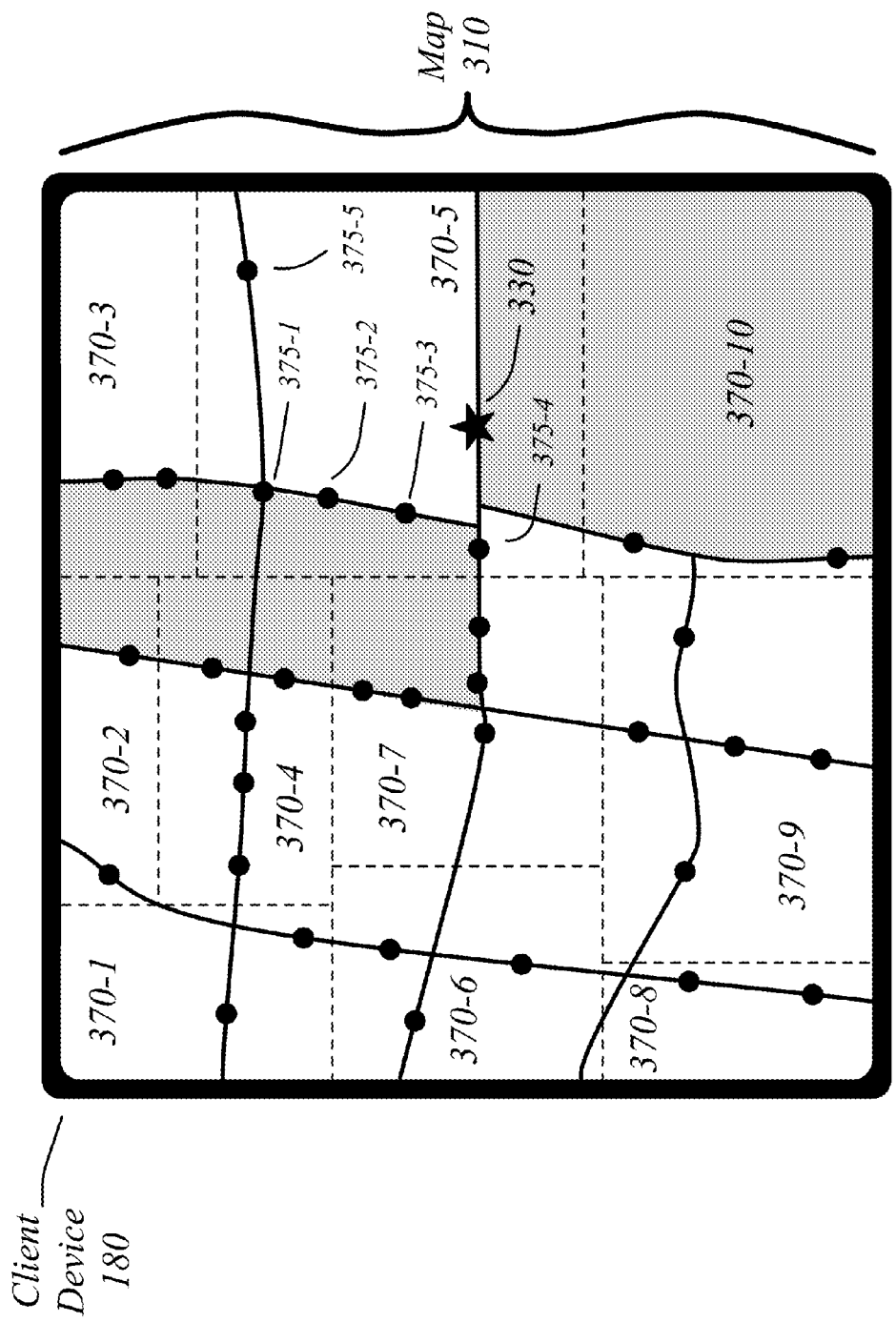
FIG. 3 illustrates an embodiment of a device displaying tiles received from the system of FIG. 1.

FIG. 3 illustrates an embodiment of map 310 displayed on a client device 180 for the search system 100. As shown in FIG. 3, the map 310 includes the display of a current location 330 as a star on the map 310.

In the illustration of FIG. 3 the various solid lines within the map 310 may represent various roads. The various light and dark areas may represent various terrain features. These solid lines and areas may be received from the map system 250 and used as a background for the display of the plurality of tiles 170.

In the illustration of FIG. 3 the various dots, such as 375-1, may represent locations received as part of the plurality of tiles 170. The dotted lines may represent the dividing areas between different tiles, wherein each exclusive rectangle formed from four dotted lines represents the exclusive area of a tile. As illustrated, the locations displayed on map 310 were received as ten tiles 370-a. Tile 370-5, for example, includes locations 375-b.

As illustrated in FIG. 3, each tile comprises five locations, with some tiles bordering the edge of the display having only a subset of their locations displayed, which may represent the remained of their locations falling outside the boundaries of the displayed geographic area. These five locations may be the five most-relevant locations within each tile. It will appreciated that a limit of five locations is used for convenience of illustration and does not represent a specific limit on the number of locations that may be contained with a tile.

As illustrated, the various tiles are of varying size and dimension. For example, tile 370-4 is noticeably smaller than even the visible area of tile 370-10. This may represent, for instance, tile 370-4 being for a higher-density area of relevant locations than tile 370-10. The geographic area for tile 370-10 may have been constructed as larger than the geographic area for tile 370-4 in response to a determination that the geographic area for tile 370-10 contains a lower density of relevant locations than the geographic area for tile 370-4.

Figure 4:
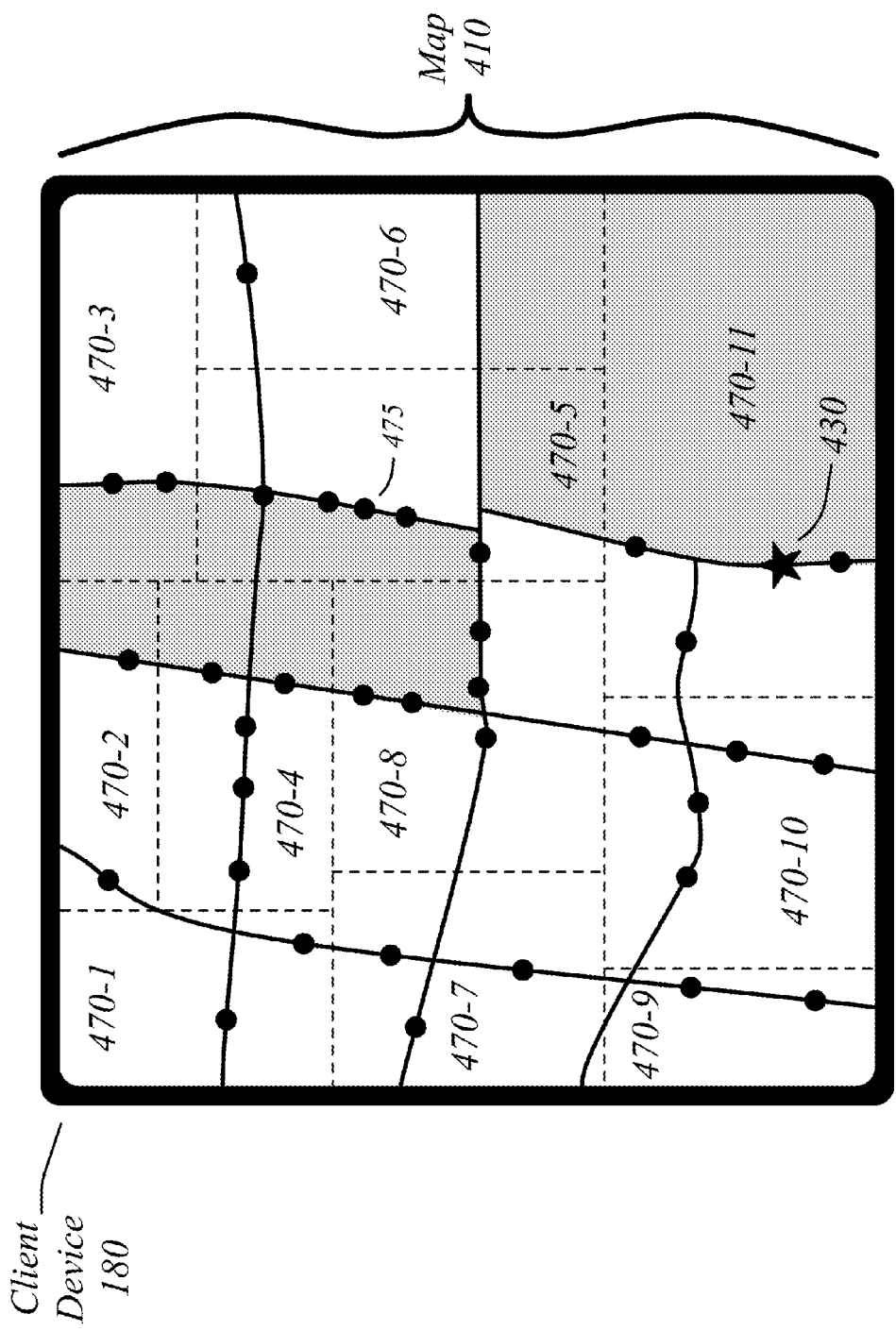
FIG. 4 illustrates an embodiment of a device displaying modified tiles received from the system of FIG. 1.

FIG. 4 illustrates an embodiment of map 410 displayed on the client device 180 for the search system 100. As shown in FIG. 4, the map 410 includes the display of a current location 430 as a star on the map 410.

Map 410, as illustrated, depicts the same geographic area as map 310 with reference to FIG. 3. However, the tiling has changed from tiles 370-a to 470-c. For example, location 475 has been added to map 410 and was not present in map 310. Location 475 may indicate a new real-world location of sufficient relevance for inclusion in tiles 470-c or may be a location that existed at the time tiles 370-a but which has been reevaluated or changed to increase its importance so as to motivate its inclusion. As each tile, in this example, contains at most five locations, this may have resulted in a new tiling in which tile 470-5 is created that includes location 475.

Alternatively, the new tiling represent by tiles 470-c may have been motivated by a reevaluation of the varying density within the geographic area of map 410. The geographic area within tile 470-5 may have, between the times of creation of tiles 370-a and 470-c, increased in density of relevant locations. This may have resulted in the search system 100 creating a new tiling using a smaller tile for the area within tile 470-5. In either case, the tile component 150 may be operative to determine a first plurality of tiles 370-a for a first location-based request and to determine a second plurality of tiles 470-c for a second location-based request, wherein the first plurality of tiles 370-a and second plurality of tiles 470-c are at the same scope and for the same geographic area in response to a retiling of the geographic area, wherein at least a first tile of the first plurality of tiles 370-a is of a distinct size, shape, or location as a second tile of the second plurality of tiles 470-c while overlapping with the first tile.

Figure 5:
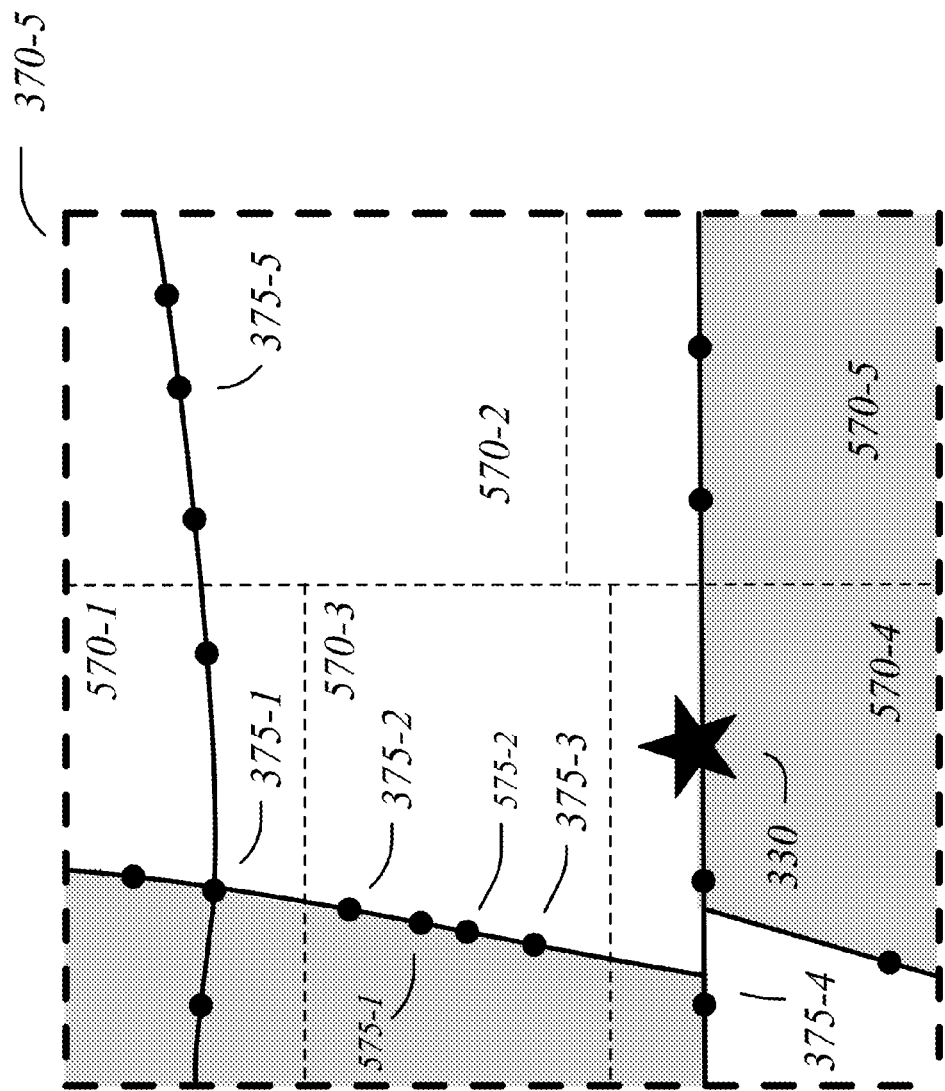
FIG. 5 illustrates an embodiment of tiles at a higher zoom level for the system of FIG. 1.

FIG. 5 illustrates an embodiment of a group of tiles within the geographic area of tile 370-5 with reference to FIG. 3.

Shown in FIG. 5 is the geographic area contained within tile 370-5 at a higher zoom level (decreased scope). This geographic area is covered by tiles 570-d and includes additional locations not included within tile 370-5, such as locations 575-1 and 575-2 within tile 570-3. These may be locations relevant to a particular category of tiles but of lower importance than the locations included within tile 370-5 at its higher scope.

In some embodiments, the tiles 570-d may be collectively contained with the geographic area of tile 370-5, such that tiles, or tiles within a certain category, are hierarchically organized. Alternatively, the tiles 570-d may not necessarily share boundaries with tiles at a higher scope, such as tile 370-5. For example, tile 570-5 may extend to the left and downwards (east and south) from the depicted area.

Figure 6:
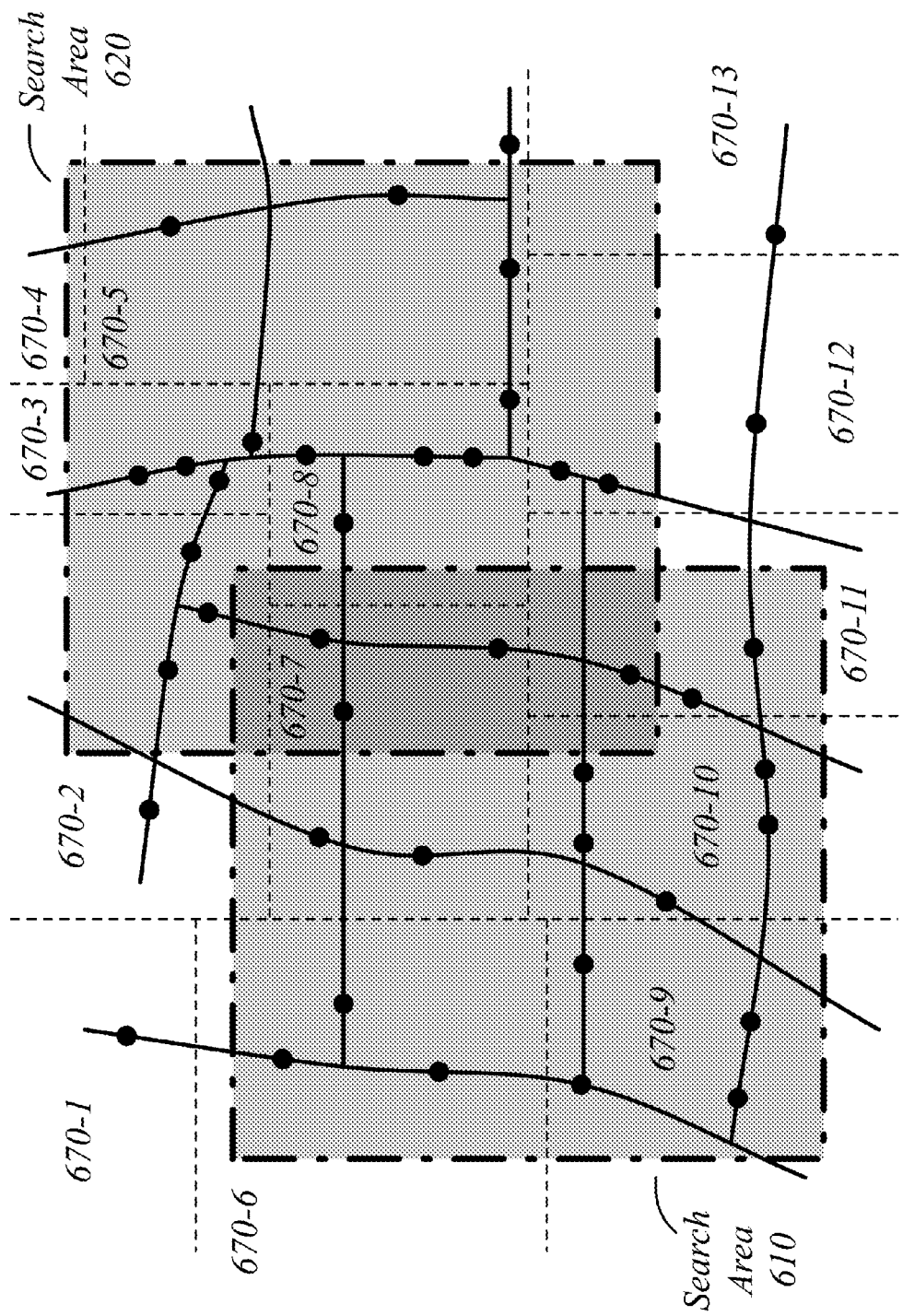
FIG. 6 illustrates an embodiment of tiles for overlapping search areas for the system of FIG. 1.

FIG. 6 illustrates an embodiment of tiles for overlapping search areas for the system of FIG. 1.

Shown in FIG. 6 are a first search area 610, a second search area 620, and a number of tiles 670-e containing various locations. Tiles 670-e are all at the same scope and for the same category, and thus are geographically distinct and do not overlap. Search system 100, in response to a first request, may identify tiles 670-2, 670-6, 670-7, 670-8, 670-9, 670-10, and 670-11 as covering search area 610. Search system 100, in response to a second request, may identify tiles 670-2, 670-3, 670-4, 670-5, 670-7, 670-8, 670-10, 670-11, 670-12, and 670-13 as covering search area 620. As can be seen, tiles 670-7, 670-8, 670-10, and 670-11 would be used to cover both search are 610 and search area 620.

If search area 620 is received shortly in sequence after search area 610 from the same client application 190 then it may be advantageous to respond to the request with search area 620 by transmitting only those tiles used to cover search area 620 which are not already being transmitted or to be transmitted in processing the request with search area 610: 670-2, 670-3, 670-4, 670-5, 670-12, and 670-13. If client application 190 receives common tiles 670-7, 670-8, 670-10, and 670-11 as part of a response to the first request then it may simply reuse them in combination with the tiles received as part of a response to the second request in order to display locations for the entirety of search area 620. This may reduce the bandwidth used to respond to the pair of requests.

As such, in general, the communication component may be operative to receive a second location-based request from the client application 190, the second location-based request 190 comprising a second geographic area, such as search area 620, the second location-based request comprising the location-based request 130 and geographic area, such as search area 610, tagged as a previous location-based request, the second geographic area overlapping the geographic area from the previous location-based request, and to transmit a second plurality of tiles to the client application 190. The tile component 150 may be operative to determine the second plurality of tiles that covers the remaining area and excludes tiles that would be used to cover the geographic area from the previous location-based request. In some embodiments, a different tile component may be used, such as in a distributed system, multithreaded system, multiprocessor system, or other system using a plurality of similar or identical component to process requests in parallel.

In some embodiments, the search system 100 may be operative to prime a client application 190 to pre-fetch tiles that may be used in a follow-up location-based request. For example, tiles at a higher zoom level may be pre-fetched in order to have their respective locations available in the eventuality that a user decides to examine their local area more closely than a default scope for the client application 190. Similarly, tiles at a lower zoom level may be pre-fetched in order to have their respective locations available in the eventuality that a user decides to examiner their surrounding area more broadly than the default scope. Surrounding tiles at the same zoom level may be pre-fetched in order to have their respective locations available in the eventuality that a user decides to scroll a displayed map. It may be valuable to have these additional tiles transmitted in a second, follow-up transmission so as to not compete for bandwidth and processing power with the transmission and display of the immediately-requested locations.

As such, the tile component 150 may be operative to determine a second plurality of tiles related to the location-based request 130 covering a distinct adjacent geographic area or covering at least a portion of the geographic area at a different zoom level. The communication component 120 may be operative to instruct the client application 190 to request the second plurality of tiles, receive a request from the client application 190 for the second plurality of tiles, and transmit the second plurality of tiles to the client application 190 in response. The client application 190 may be operative to submit the request for the second plurality of tiles in response to the completed transfer of the plurality of tiles 170.

For example, the client application 190 may submit the location-based request 130 to the search system 100 and receive in response the plurality of tiles 170 and a pre-fetch instruction. The client application 190 may wait until the plurality of tiles 170 have finished being received and then use the pre-fetch instruction to initiate the download of additional related tiles. In one embodiment, the pre-fetch instruction may comprise a single identifier, structure, or other signifier that references or contains the location-based request 130 and is sufficient to request that the search system 100 provide additional tiles. Alternatively, the pre-fetch instruction may comprise a list of tiles that should be pre-fetched which the client application 190 may explicitly request.

Figure 7:
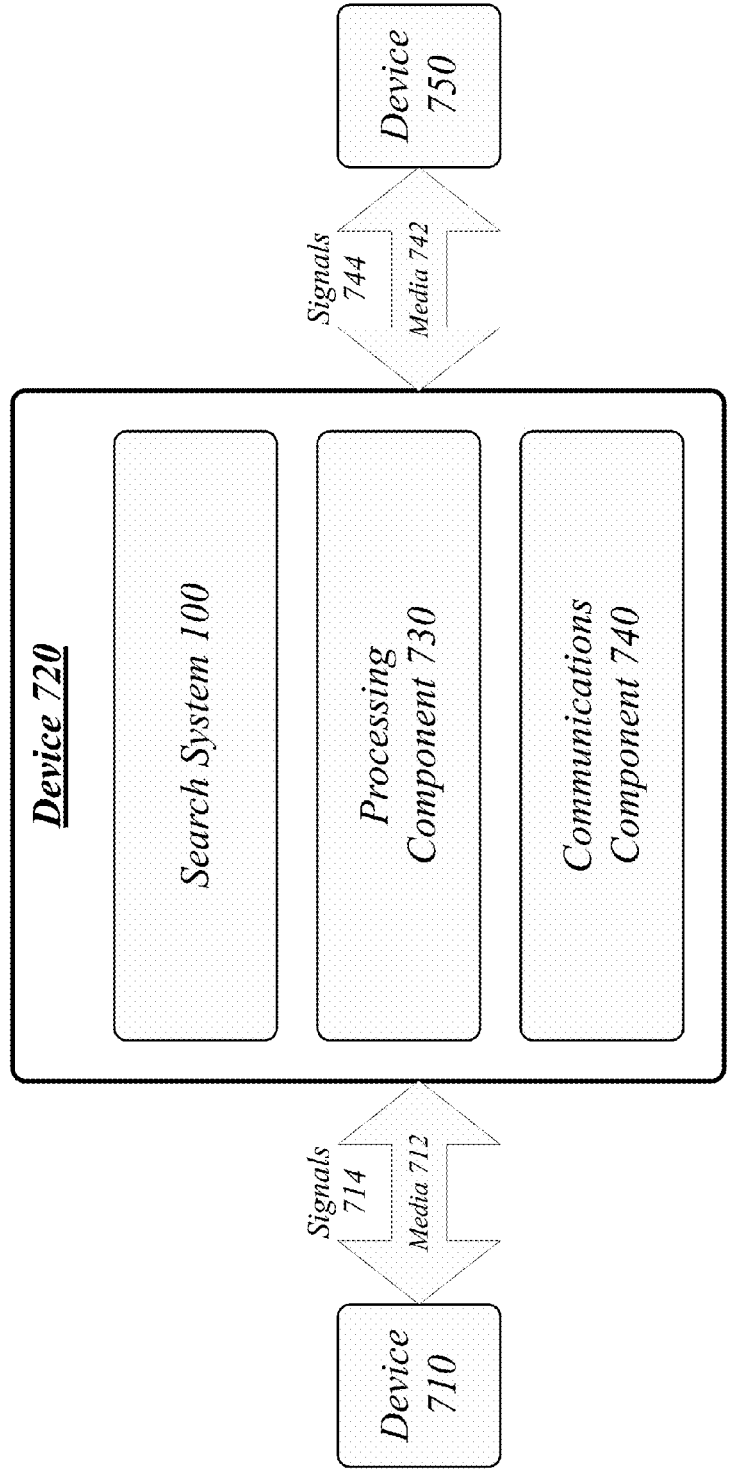
FIG. 7 illustrates an embodiment of a centralized system for the system of FIG. 1.

FIG. 7 illustrates a block diagram of a centralized system 700. The centralized system 700 may implement some or all of the structure and/or operations for the search system 100 in a single computing entity, such as entirely within a single device 720.

The device 720 may comprise any electronic device capable of receiving, processing, and sending information for the search system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 720 may execute processing operations or logic for the search system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 720 may execute communications operations or logic for the search system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712, 742 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 720 may communicate with other devices 710, 750 over a communications media 712, 742, respectively, using communications signals 714, 744, respectively, via the communications component 740. The devices 710, 750 may be internal or external to the device 720 as desired for a given implementation. For example, device 710 may comprise a client device 180 such that signals 714 sent over media 712 comprise the transmission of the location-based request 130 to the search system 100 and the transmission of the plurality of tiles 170 from the search system 100 to the device 710. Device 750 may comprise a second client device used by a different user, which interacts with the search system 100 to request tiles, receive tiles, either earlier, later, or in parallel with device 710.

Figure 8:
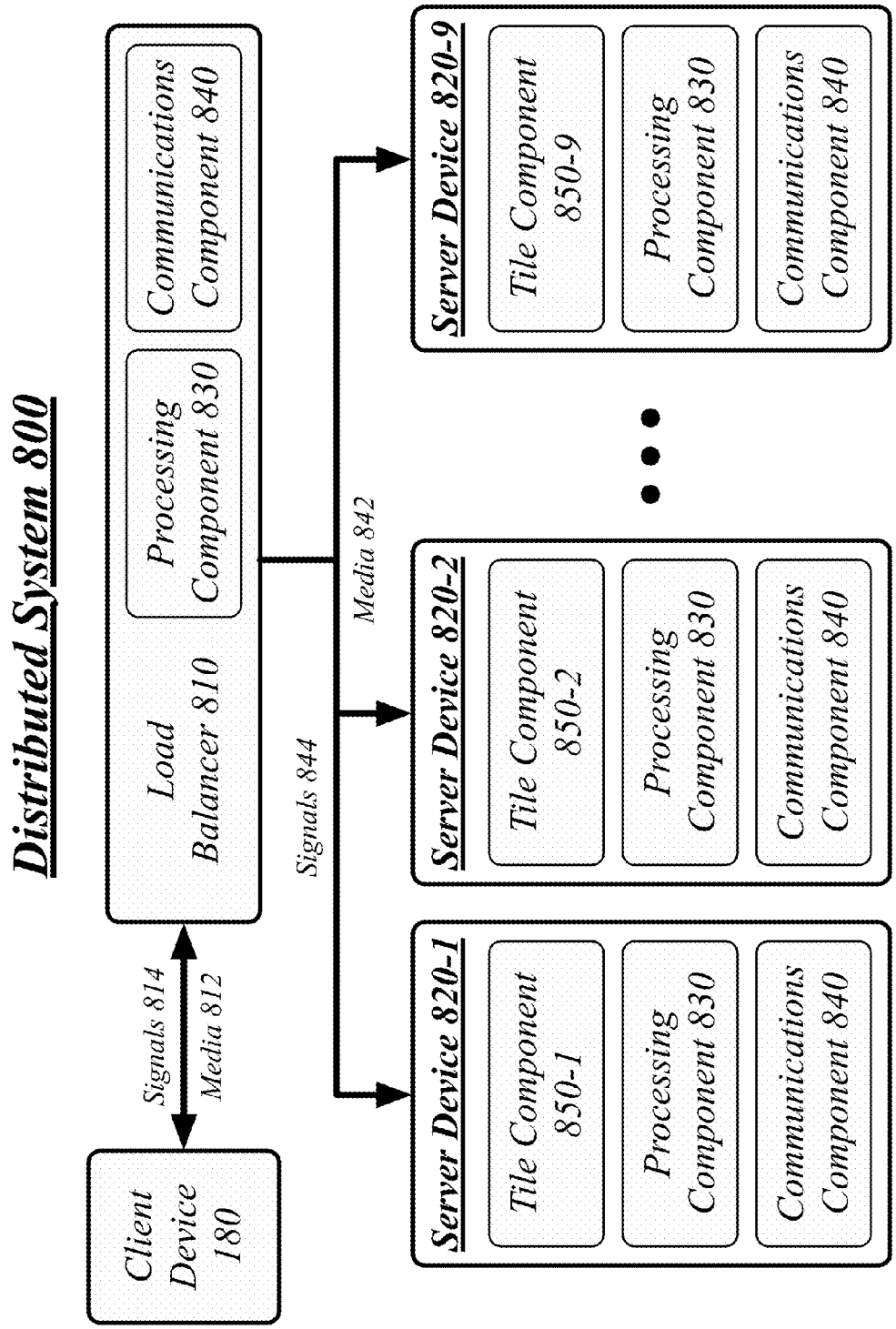
FIG. 8 illustrates an embodiment of a distributed system for the system of FIG. 1.

FIG. 8 illustrates a block diagram of a distributed system 800. The distributed system 800 may distribute portions of the structure and/or operations for the search system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a client device 180, a load balancer 810, and a plurality of server devices 820-f. In general, the client device 180, load balancer 810, and plurality of server devices 820-f may be the same or similar to the client device 720 as described with reference to FIG. 7. For instance, the client device 180, load balancer 810, and server systems 820-f may each comprise a processing component 830 and a communications component 840 which are the same or similar to the processing component 730 and the communications component 740, respectively, as described with reference to FIG. 7. In another example, the devices 180, 810, and 820 may communicate over a communications media 812 and 842 using communications signals 814 and 844 via the communications components 840.

The client device 180 may comprise or employ one or more client programs that operate to perform various methodologies in accordance with the described embodiments. In one embodiment, for example, the client device 810 may implement the client application 190.

The load balancer 810 may be operative to intercede between various client applications, such as may run on client device 180, and the various tile components 850-g. The load balancer 810 may receive the location-based request 130 from a client device 180 and distribute the location-based request to one tile component 150 of a plurality of tile components 850-g based on one of any of the known techniques for distributing tasks among parallel servers in a distributed computing environment.

The server devices 820-f may comprise or employ one or more server programs that operate to perform various methodologies in accordance with the described embodiments. In one embodiment, for example, the server devices 820-f may implement a plurality of tile components 850-g. Each of the plurality of tile component 850-g may be operative to receive requests for location-based information and determine responding sets of tiles for transmission back to requesting client devices.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9 illustrates one embodiment of a logic flow 900. The logic flow 900 may be representative of some or all of the operations executed by one or more embodiments described herein.

In the illustrated embodiment shown in FIG. 9, the logic flow 900 may receive a location-based request 130 from a client application 190, the location-based request 130 comprising a geographic area at block 902. For example, the location-based request 130 received from the client application 190 on a mobile device, the geographic area containing a current location 225 of the mobile device. In some embodiments, the location-based request 130 may specify a zoom level.

The logic flow 900 may receive a second location-based request from the client application 190, the second location-based request comprising a second geographic area, the second location-based request comprising the location-based request 130 and geographic area tagged as a previous location-based request, the second geographic area overlapping the geographic area from the previous location-based request.

The logic flow 900 may determine a plurality of tiles 170 that cover the geographic area, each tile of the plurality of tiles 170 covering a portion of the geographic area and comprising a set of locations at block 904.

For example, each of the plurality of tiles 170 may be specific to a category of location types. Determining the plurality of tiles 170 may comprise mapping the received location-based request 130 to the category of location types and determining the plurality of tiles 170 according to the mapped category of location types. The plurality of tiles 170 may comprise a first tile, the first tile covering a first geographic area, the first tile comprising a first set of locations within the first geographic area, the first set of locations selected from a total set of locations according to a relative importance of the selected first set of locations within the total set of locations. Where each of the plurality of tiles 170 is specific to a category of location types, the first tile may comprise a first set of location selected from a total set of locations of that category of location types according to a relative importance of the selected first set of location within the total set of locations specific to the category of location types.

Where the location-based request 130 specifies a zoom level, determining the plurality of tiles 170 may include matching the specified zoom level to the range of zoom levels associated with each of the plurality of tiles 170.

The plurality of tiles 170 may comprise a first tile and a second tile, the first tile covering a first geographic area, the second tile covering a second geographic area distinct from the first geographic area, the first geographic area larger than the second geographic area. In some embodiments, the first geographic area may be constructed as larger than the second geographic area in response to a determination that the first geographic area contains a lower density of relevant locations.

The logic flow 900 may further include determining a second plurality of tiles related to the location-based request 130 covering a distinct adjacent geographic area or covering at least a portion of the geographic area at a different zoom level, instructing the client application 190 to request the second plurality of tiles, receiving a request from the client application 190 for the second plurality of tiles, and transmitting the second plurality of tiles to the client application 190.

Where a second location-based request was received from the client application 190, the logic flow 900 may determine a second plurality of tiles that covers the remaining area and excludes tiles that would be used to cover the geographic area from the previous location-based request.

The logic flow 900 may transmit the plurality of tiles 170 to the client application 190 at block 906. For example, the transmitted plurality of tiles 170 may be for display on a mobile device as an overlay on a map including a display of the current location 225 of the mobile device in relation to the received sets of locations.

Where a second plurality of tiles was determined, the logic flow 900 may transmit the second plurality of tiles to the client application 190.

The embodiments are not limited to this example.

Figure 10:
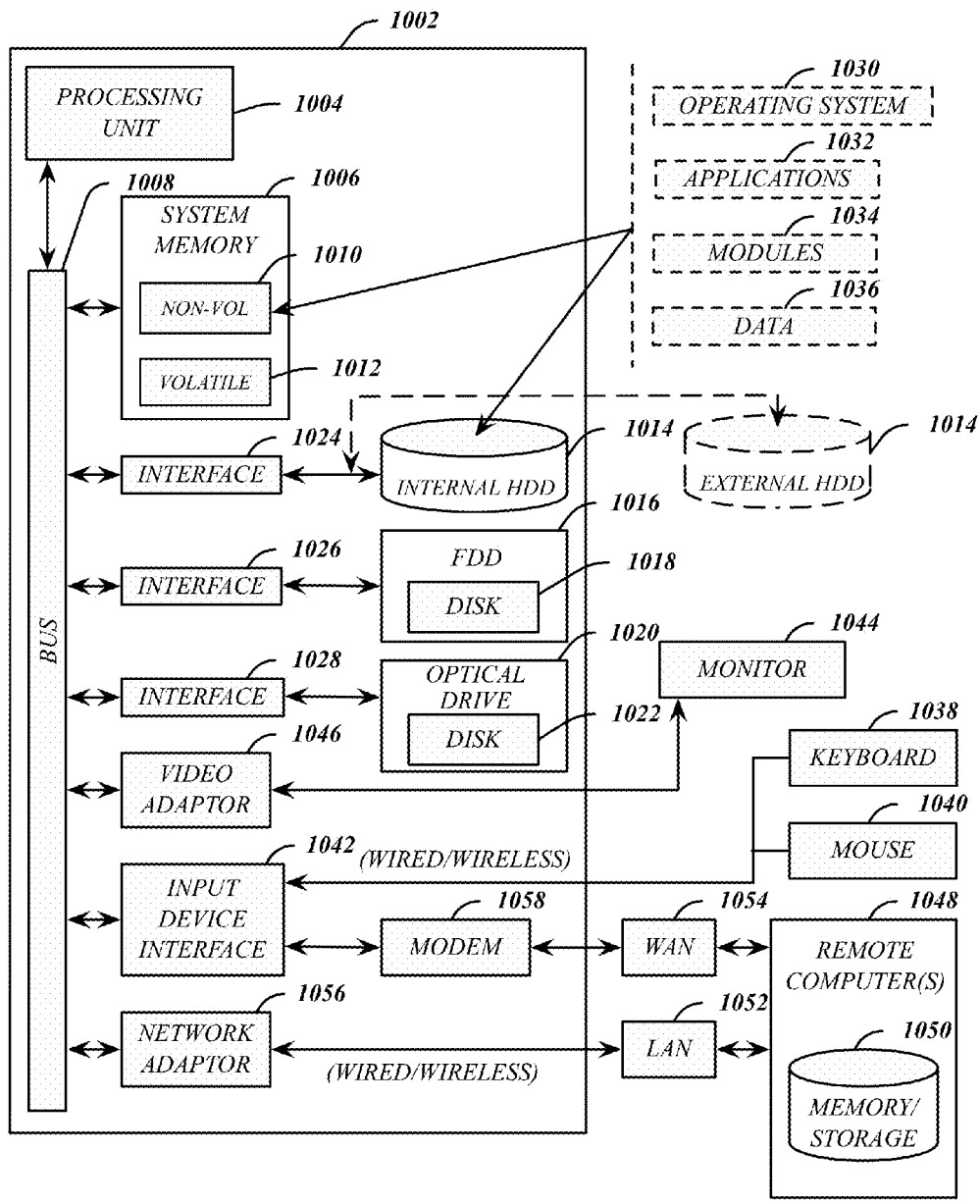
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 7 and FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the search system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
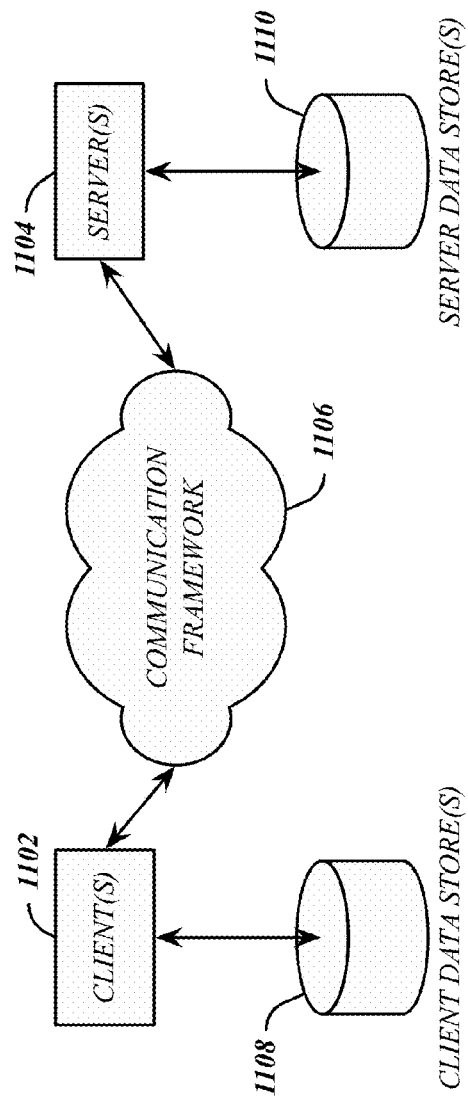
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server device 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
    receiving a location-based request from a client application, the location-based request comprising a geographic area and a search term;
    mapping the received location-based request to a category of location types;
    determining a plurality of tiles that cover the geographic area according to the mapped category of location types, each tile of the plurality of tiles specific to a category of location types, covering a portion of the geographic area,. and comprising a set of locations;
    flagging a first subset of locations in the set of locations as relevant to the search term and a second subset of locations in the set of locations as irrelevant to the search term; and
    transmitting the plurality of tiles including the first and second subsets of locations to the client application.

2. The method of claim 1, the location-based request received from the client application on a mobile device, the geographic area containing a current location of the mobile device, the transmitted plurality of tiles for display on the mobile device as an overlay on a map including a display of the current location of the mobile device in relation to the received sets of locations.

3. The method of claim 1, the location-based request specifying a zoom level, each tile of the plurality of tiles associated with a range of zoom levels, further comprising:
determining the plurality of tiles by matching the specified zoom level to the range of zoom levels associated with each of the plurality of tiles.

4. The method of claim 1, the plurality of tiles comprising a first tile, the first tile covering a first geographic area, the first tile comprising a first set of locations within the first geographic area, the first set of locations selected from a total set of locations according to a relative importance of the selected first set of locations within the total set of locations.

5. The method of claim 1, the plurality of tiles comprising a first tile and a second tile, the first tile covering a first geographic area, the second tile covering a second geographic area distinct from the first geographic area, the first geographic area larger than the second geographic area.

6. The method of claim 5, the first geographic area constructed as larger than the second geographic area in response to a determination that the first geographic area contains a lower density of relevant locations.

7. The method of claim 1, comprising:
determining a second plurality of tiles related to the location-based request covering a distinct adjacent geographic area or covering at least a portion of the geographic area at a different zoom level;
instructing the client application to request the second plurality of tiles;
receiving a request from the client application for the second plurality of tiles; and
transmitting the second plurality of tiles to the client application.

8. The method of claim 1, comprising:
receiving a second location-based request from the client application, the second location-based request comprising a second geographic area, the second location-based request comprising the location-based request and geographic area tagged as a previous location-based request, the second geographic area overlapping the geographic area from the previous location-based request;
determining a second plurality of tiles that covers a remaining area and excludes tiles that would be used to cover the geographic area from the previous location-based request;
transmitting the second plurality of tiles to the client application.

9. An apparatus, comprising:
a processor circuit on a device;
a communication component operative on the processor circuit to receive a location-based request from a client application, the location-based request comprising a geographic area and a search term, and to transmit a plurality of tiles to the client application; and
a tile component operative on the processor circuit to map the received location-based request to a category of location types, determine the plurality of tiles as a set of tiles according to the mapped category of location types that cover the geographic area, each tile of the plurality of tiles specific to a category of location types, covering a portion of the geographic area, and comprising a set of locations, and to flag a first subset in the set of locations as relevant to the search term and a second subset of locations as irrelevant to the search term, wherein the transmitted plurality of tiles includes the first and second subsets of locations.

10. The apparatus of claim 9, the location-based request specifying a zoom level, each tile of the plurality of tiles associated with a range of zoom levels, the tile component operative to determine the plurality of tiles by matching the specified zoom level to the range of zoom levels associated with each of the plurality of tiles.

11. The apparatus of claim 9, the plurality of tiles comprising a first tile, the first tile covering a first geographic area, the first tile comprising a first set of locations within the first geographic area, the first set of locations selected from a total set of locations according to a relative importance of the selected first set of locations within the total set of locations.

12. The apparatus of claim 9, the plurality of tiles comprising a first tile and a second tile, the first tile covering a first geographic area, the second tile covering a second geographic area distinct from the first geographic area, the first geographic area larger than the second geographic area.

13. The apparatus of claim 9, comprising:
the tile component operative to determine a second plurality of tiles related to the location-based request covering a distinct adjacent geographic area or covering at least a portion of the geographic area at a different zoom level; and
the communication component operative to instruct the client application to request the second plurality of tiles, receive a request from the client application for the second plurality of tiles, and transmit the second plurality of tiles to the client application.

14. The apparatus of claim 9, comprising:
the communication component operative to receive a second location-based request from the client application, the second location-based request comprising a second geographic area, the second location-based request comprising the location-based request and geographic area tagged as a previous location-based request, the second geographic area overlapping the geographic area from the previous location-based request, and to transmit a second plurality of tiles to the client application; and
a second tile component operative to determine the second plurality of tiles that covers a remaining area and excludes tiles that would be used to cover the geographic area from the previous location-based request.

15. At least one non-transitory computer-readable storage medium comprising instructions that, when executed, cause a system to:
receive a location-based request from a client application, the location-based request comprising a geographic area, a search term, and a zoom level;
map the received location-based request to a category of location types;
determine a plurality of tiles that cover the geographic area according to the mapped category of location types, each tile of the plurality of tiles specific to a category of location types, covering a portion of the geographic area, associated with a range of zoom levels including the zoom level, and comprising a set of locations;
flag a first subset of locations in the set of locations as relevant to the search term and a second subset of locations in the set of locations as irrelevant to the search term; and transmit the plurality of tiles including the first and second subsets of locations to the client application.

16. The computer-readable storage medium of claim 15, the plurality of tiles comprising a first tile, the first tile covering a first geographic area, the first tile comprising a first set of locations within the first geographic area, the first set of locations selected from a total set of locations according to a relative importance of the selected first set of locations within the total set of locations.

17. The computer-readable storage medium of claim 15, the plurality of tiles comprising a first tile and a second tile, the first tile covering a first geographic area, the second tile covering a second geographic area distinct from the first geographic area, the first geographic area larger than the second geographic area.

18. The computer-readable storage medium of claim 15 comprising further instructions that, when executed, cause a system to:
   determine a second plurality of tiles related to the location-based request covering a distinct adjacent geographic area or covering at least a portion of the geographic area at a different zoom level;
   instruct the client application to request the second plurality of tiles;
   receive a request from the client application for the second plurality of tiles; and
   transmit the second plurality of tiles to the client application.

19. The computer-readable storage medium of claim 15 comprising further instructions that, when executed, cause a system to:
   receive a second location-based request from the client application, the second location-based request comprising a second geographic area and the zoom level, the second location-based request comprising the location-based request, geographic area, and zoom level tagged as a previous location-based request, the second geographic area overlapping the geographic area from the previous location-based request;
   determine a second plurality of tiles at the zoom level that covers a remaining area and excludes tiles that would be used to cover the geographic area from the previous location-based request;
   transmit the second plurality of tiles to the client application.

\* \* \* \* \*